United States Patent
Wang et al.

(10) Patent No.: US 7,948,907 B2
(45) Date of Patent: May 24, 2011

(54) SELECTIVE NETWORK SWITCHING IN A WIRELESS BROADCAST NETWORK

(75) Inventors: Michael Mao Wang, San Diego, CA (US); Ashok Mantravadi, San Diego, CA (US); Murali Ramaswamy Chari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 651 days.

(21) Appl. No.: 11/343,380

(22) Filed: Jan. 30, 2006

(65) Prior Publication Data

US 2006/0227718 A1 Oct. 12, 2006

Related U.S. Application Data

(60) Provisional application No. 60/669,555, filed on Apr. 7, 2005.

(51) Int. Cl.
H04L 12/26 (2006.01)
H04W 4/00 (2009.01)

(52) U.S. Cl. .................................. 370/252; 370/331

(58) Field of Classification Search ............ 455/101, 455/132, 272, 273, 277.1, 277.2, 278.1, 436, 455/437, 160.1, 186.1, 161.3, 168.1, 177.1, 455/179.1, 180.1, 184.1, 191.3, 197, 199.1, 455/226.2, 226.3; 370/345, 328, 342, 204, 370/276, 332
See application file for complete search history.

(56) References Cited

U.S. PATENT DOCUMENTS

| | | | |
|---|---|---|---|
| 6,463,265 B1 | 10/2002 | Cohen et al. | |
| 7,181,170 B2 * | 2/2007 | Love et al. | 455/67.13 |
| 7,248,841 B2 * | 7/2007 | Agee et al. | 455/101 |
| 7,313,375 B2 * | 12/2007 | Lee et al. | 455/186.1 |
| 2003/0036384 A1 | 2/2003 | Chen et al. | |
| 2003/0036402 A1 * | 2/2003 | Gelsomino | 455/517 |
| 2004/0100937 A1 * | 5/2004 | Chen | 370/345 |

FOREIGN PATENT DOCUMENTS

| | | |
|---|---|---|
| CN | 1543712 | 11/2004 |
| DE | 103 08 930 A1 | 9/2004 |
| EP | 1 326 462 A1 | 7/2003 |
| JP | 10079700 | 3/1998 |
| JP | 200023226 | 1/2000 |
| RU | 2003110314 | 1/2007 |
| WO | WO02099983 | 12/2002 |
| WO | WO03017713 | 2/2003 |

OTHER PUBLICATIONS

International Search Report—PCT/US2006/012844, International Searching Authority—European Patent Office—Aug. 9, 2006.
Written Opinion—PCT/US2006/012844, International Searching Authority—European Patent Office—Aug. 9, 2006.
International Preliminary Report on Patentability—PCT/US2006/012844, International Bureau of WIPO—Geneva, Switzerland—Oct. 9, 2007.

* cited by examiner

*Primary Examiner* — Melody Mehrpour
(74) *Attorney, Agent, or Firm* — Gerald P. Joyce, III

(57) ABSTRACT

The disclosure is directed to a mobile communication device that may receive wireless broadcast signals from a number of different base stations or transmitters. As the location of the device moves relative to the transmitters, one transmitter will likely be identified as the transmitter broadcast the strongest, or highest quality, signal. When that determination is made, the user of the mobile device is presented the opportunity to switch to receiving that transmitters signal. Based on the user's reply, the device may remain with the current transmitter, even though it does not have the strongest signal, or the device may be configured to acquire and start receiving the new transmitter's signal. The measuring of the quality of a transmitter's signal may be based on a composite score that combines a number of individual measurements made over a predetermined period of time.

32 Claims, 6 Drawing Sheets

SELECTIVE NETWORK SWITCHING IN A WIRELESS BROADCAST NETWORK

CLAIM OF PRIORITY UNDER 35 U.S.C. §119

The present Application for Patent claims priority to Provisional Application No. 60/669,555 entitled "TIMING RECOVERY AND NETWORK SWITCHING FOR FLO" filed Apr. 7, 2005, and assigned to the assignee hereof and hereby expressly incorporated by reference herein.

BACKGROUND

1. Field

The present disclosure relates generally to telecommunications, and more particularly, to systems and methods to support a mobile communications device capable of communicating via a wireless broadcast network.

2. Background

Wireless and wireline broadcast networks are widely deployed to provide various data content to a large group of users. A common wireline broadcast network is a cable network that delivers multimedia content to a large number of households. A cable network typically includes headends and distribution nodes. Each headend receives programs from various sources, generates a separate modulated signal for each program, multiplexes the modulated signals for all of the programs onto an output signal, and sends its output signal to the distribution nodes. Each program may be distributed over a wide geographic area (e.g., an entire state) or a smaller geographic area (e.g., a city). Each distribution node covers a specific area within the wide geographic area (e.g., a community). Each distribution node receives the output signals from the headends, multiplexes the modulated signals for the programs to be distributed in its coverage area onto different frequency channels, and sends its output signal to households within its coverage area. The output signal for each distribution node typically carries both national and local programs, which are often sent on separate modulated signals that are multiplexed onto the output signal.

A wireless broadcast network transmits data over the air to wireless devices within the coverage area of the network. However, a wireless broadcast network can differ from a wireline broadcast network in several key regards. One of these differing areas is a direct result of wireless users being mobile while cable TV users, almost by definition, remain at the terminating point of the cable distribution system (e.g., their house, or place of business). Because wireless users are mobile, circumstances may arise where a user's location changes from the coverage area of one broadcast network to the coverage area of another broadcast network. If the two broadcast networks broadcast exactly the same content on exactly the same channels, then the user could be switched from one network transmitter to another (much like cellular handoffs occur) without difficulty. However, in many instances, the neighboring broadcast networks do not provide the same programs nor provide them on the same channels. Thus, automatically switching a user to the nearest broadcast network may interfere with the multimedia, or interactive, content the user is presently enjoying. Accordingly, there is a need to be able to switch wireless users in one wireless broadcast network to another, neighboring broadcast network in a manner that is both efficient and customer friendly.

SUMMARY

One aspect a wireless broadcast network system relates to a method of switching between broadcast networks in a wireless communications device. In accordance with this method, a current broadcast signal is decoded from among a plurality of broadcast signals, each from a respective broadcast network. If one of the plurality of broadcast signals is determined to have a quality score higher than the current broadcast signal, then a user of the device is queried regarding whether to switch to the one of the plurality of broadcast signals. If the user elects to switch, then the device begins decoding the one of the plurality of broadcast signals instead of the current broadcast signal; otherwise, decode of the current broadcast signal is continued.

Another aspect of a wireless communications device relates to a device that includes a processor configured to determine one of a plurality of broadcast networks having a highest quality score. The device also includes a user interface configured receive from a user of the device a command related to selecting the one of the plurality of networks; and a receiver, controlled by the processor, and configured to change from decoding a current broadcast signal to decoding a signal of the one of the plurality of broadcast networks based on the command.

Yet another aspect of a wireless communications device relates to a device that includes a receiver configured to decode a current signal from a current broadcast network within a plurality of broadcast networks, each having a respective signal. The device also has a processor configured to determine one of the respective signals having a highest quality score, relative to the others. There is also a user interface configured a) to present to a user of the device a query that includes an inquiry about selecting the one of the respective signals for decoding, and b) to receive an instruction from the user in response to the query. The device includes a receiver configured, depending on the instruction, to a) continue decoding the current signal even if the one of the respective signals is not the current signal, if the instruction so indicates or b) switch to decoding the one of the respective signals, if the instruction so indicates.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

Figure 1A:
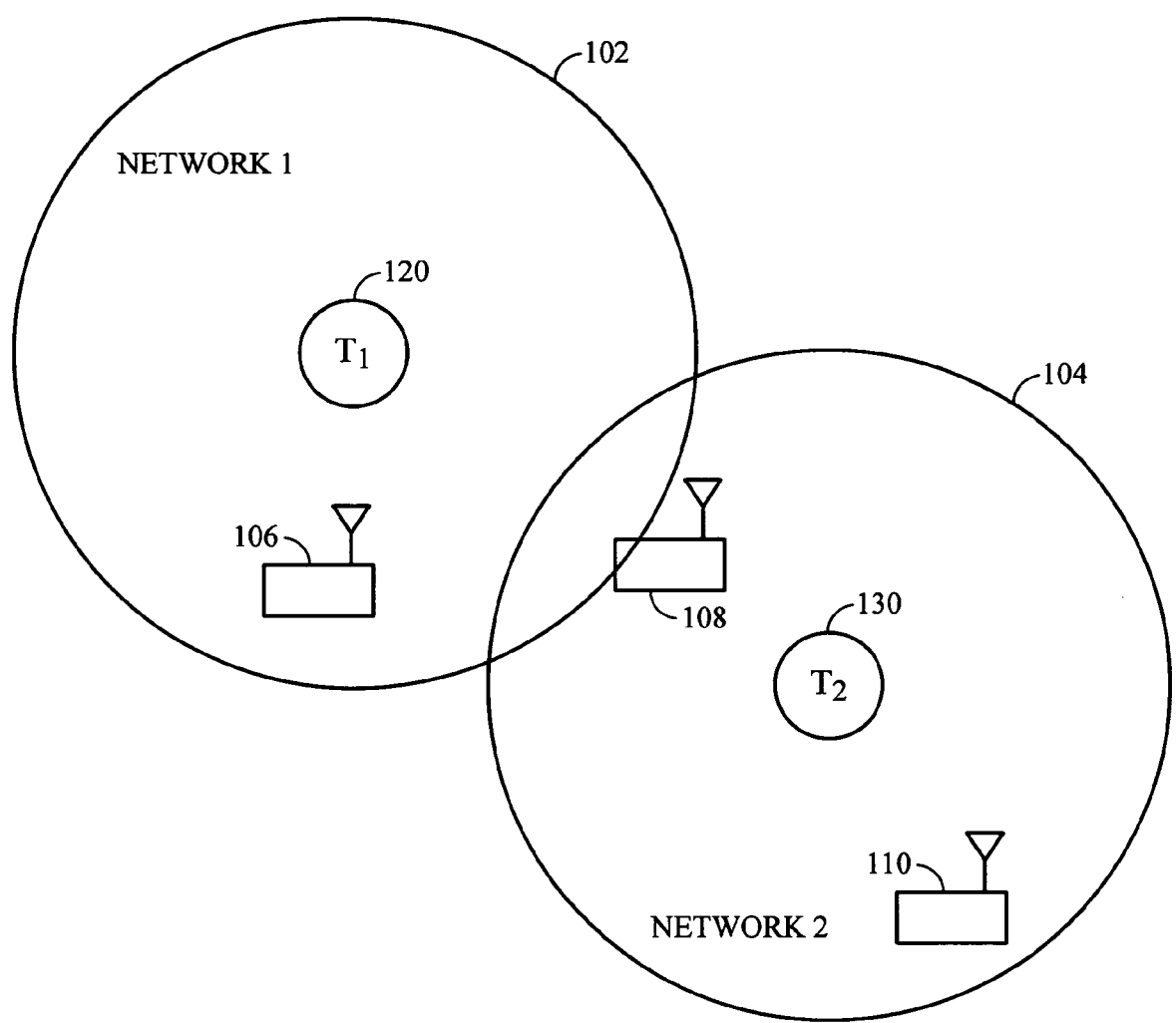
FIG. 1A is a diagram of two adjacent wireless broadcast networks.

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Techniques for broadcasting different types of transmissions (e.g., local and wide-area transmissions) in a wireless broadcast network are described herein. As used herein, "broadcast" and "broadcasting" refer to transmission of content/data to a group of users of any size and may also be referred to as "multicast" or some other terminology. A wide-area transmission is a transmission that may be broadcast by all or many transmitters in the network. A local transmission is a transmission that may be broadcast by a subset of the transmitters for a given wide-area transmission. Different local transmissions may be broadcast by different subsets of the transmitters for a given wide-area transmission. Different wide-area transmissions may also be broadcast by different groups of transmitters in the network. The wide-area and local transmissions typically carry different contents, but these transmissions may also carry the same content.

One example of such a broadcast network is the QUALCOMM MediaFLO™ network that delivers a programming lineup with a bit rate of about 2 bits per second per Hz. The technology used is an orthogonal frequency division multiplexing (OFDM)-based air interface designed specifically for multicasting a significant volume of rich multimedia content cost effectively to wireless subscribers. It takes advantage of multicasting technology in a single-frequency network to significantly reduce the cost of delivering identical content to numerous users simultaneously. Furthermore, the coexistence of local and wide area coverage within a single RF channel (e.g., 700 MHz) is supported as described above. This segmentation between wide area and local area supports more targeted programming, local advertising, and the ability to blackout and retune as required. MediaFLO™ is merely an example of the type of broadcast networks described herein and other, functionally equivalent broadcast networks are contemplated as well.

Much like cable TV, a subscriber within a wireless broadcast network can subscribe to different packages and tiers of service (e.g., premium movies, sports, etc.) that provide them with a set of channels (e.g., tennis, ESPN, soap operas, BBC, etc.). Different content providers forward the content to the broadcast networks which then combine the content and broadcast it according to a predetermined schedule. During provisioning of a user's mobile device the capability to receive and decode the channels to which the user subscribes is programmed into the mobile device. The provisioning may be subsequently updated to remove or add other packages and channels. One of ordinary skill will recognize that the hierarchical arrangement of channels just described is merely one example of how to provide multimedia and other content. Other arrangements and organization of the data and its respective channels may be utilized without departing from the scope of the present invention.

FIG. 1A depicts two exemplary wireless broadcast networks 102, 104. Each of these networks 102, 104 may provide a variety of different channels and content to multiple subscribers in a relatively large geographical area. For example, the transmitter $T_1$ 120 of the network 102 may broadcast various channels and the transmitter $T_2$ 130 may broadcast its own channels within the network coverage area 104.

The broadcasts from the different transmitters 120, 130 are not necessarily the same and may include different channels or include different content. For example, one network 102 may be in the Pacific time zone while the other network may be in the Mountain time zone. Thus, even if both networks provide the same channel, the actual programming being broadcast may be different because of the time zone difference (e.g., the Main Event movie is scheduled to always start at 8:00 PM local time). Furthermore, there are logical channels (e.g., ESPN) and physical channels (e.g., a particular TDM time slot, or a particular frequency band). So, even though both networks 102, 104 provide ESPN, they may not broadcast it on the same physical channel.

The result of these differences is that the access to available content may change as a wireless user moves from the coverage area of one broadcast network 102 to a different broadcast network 104. Referring to FIG. 1A, the mobile device 110 is clearly within the coverage area of network 104 but the other mobile device 108 can detect the presence of both network 102, 104. As the mobile device 108 moves from the network coverage area 104 into the other network coverage area 102, the broadcast signals from the transmitter $T_1$ 120 will become stronger as compared to those from the transmitter $T_2$ 130. Because the signals are stronger, the user of the mobile device 108 will be provided better service within network 102 because there will be less signal delays, signal errors, etc. Therefore it would appear that the best thing for the mobile device 108 to do would be to measure the signal strengths from the two transmitters 120, 130 and lock-on to the stronger signal. Such an approach has a number of drawbacks.

First, the transition area between the two networks is not a clearly defined area and may vary depending on nearby structures, the direction of travel, the weather, and other similar factors. Thus, as the user moves from one network coverage area to another, the transmitter 120, 130 having the stronger signal may change back and forth multiple times until the user becomes located clearly within the new network coverage area. Therefore, if the device 108 changed to the strongest network each time a new one was detected, the content available to the client would change back and forth as well. Such an occurrence would be highly disruptive in a number of instances, especially with real-time content and interactive content.

Secondly, the user of the device 108 may want to continue enjoying a particular content channel even though the signal is degraded or poor. For example, if a sporting event is being viewed and is in its final minutes or seconds, the user may be willing to suffer degraded service to ensure watching the final moments in an uninterrupted manner.

Another possible situation may be explained with reference to the mobile device 106. Even though this device 106 appears to be clearly within the network coverage area 102, the signal from the transmitter $T_1$ 120 may not always be the strongest. For example, there may be a building or other structure between the device 106 and the transmitter 120 that creates a "shadow" that degrades reception for the device 106. Within this shadow, the signal from the other transmitter $T_2$ 130 may actually be perceived as the stronger signal. Thus, if the switch to a different network was instant and automatic, the device 108 would lock-on to the different networks when entering and leaving the shadow.

Figure 1B:
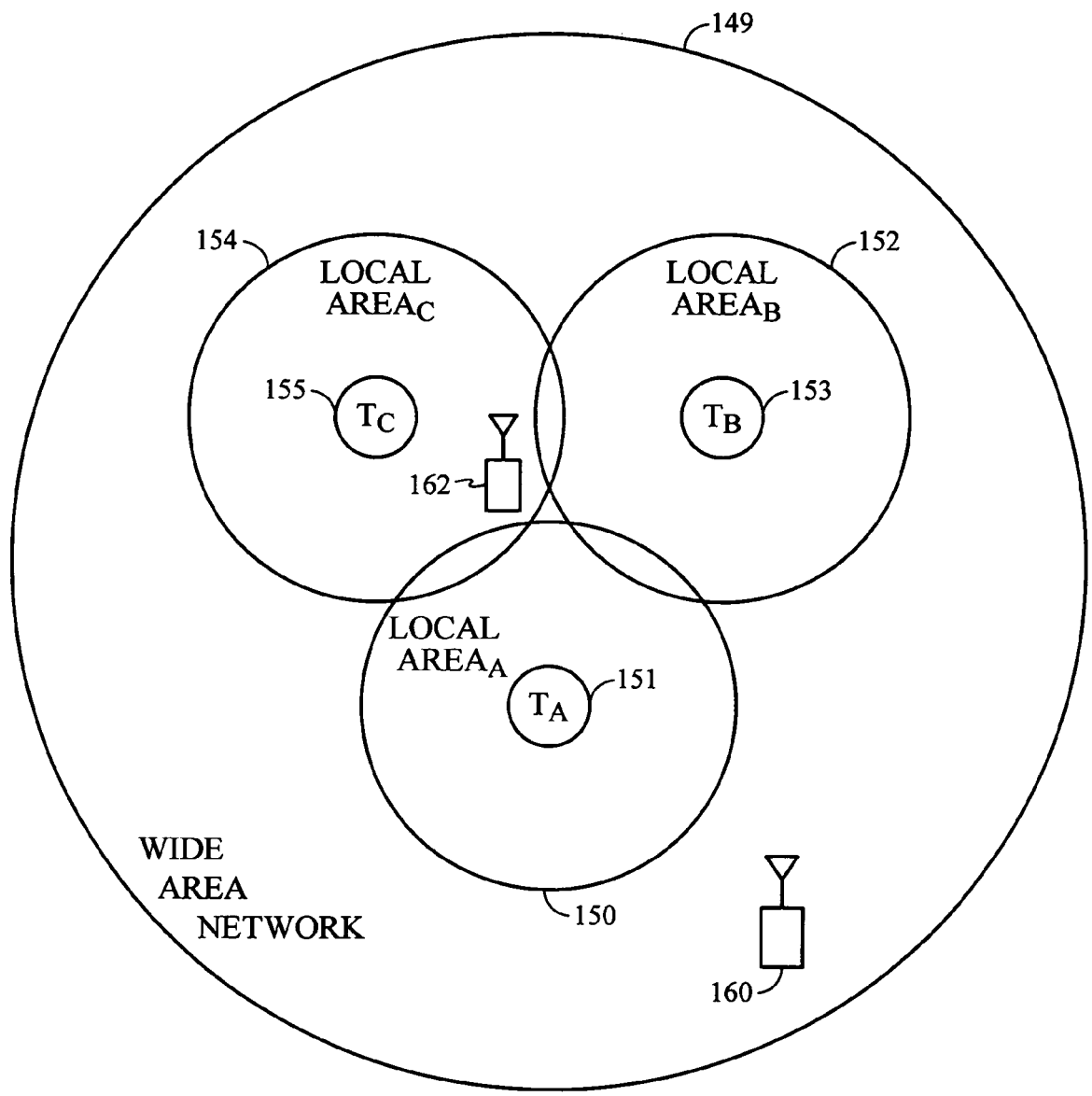
FIG. 1B is a diagram of adjacent wireless broadcast networks having different local content.

The network diagram of FIG. 1B depicts another situation where a mobile device may transition between different networks. In this example, the three transmitters (along with others not shown) transmit signals over an area that creates the wide area network 149. Within this area 149, there is a constant set of content that is the same for the entire area. This is true even if a mobile device is within one of the three local areas 150, 152, 154. Within those areas, however, there is a portion of the broadcast content that differs between the different networks 150, 152, 154. Thus, each network 150, 152, 154 has its own unique local content that is broadcast along with a common wide area content by transmitters 151, 153, 155, respectively. As the devices 160 and 162 move throughout the wide area network 149, the wide area content will stay the same but the local area content may differ. Thus, similar to the situation described with respect to FIG. 1A, there may be situations where it is useful to switch between different adjacent networks and there may be instances where switching should be avoided.

Typically, the transmitters 151, 153, 155 will broadcast a signal that the mobile device will acquire, demodulate and decode in order to extract the desired content. In the OFDM system mentioned earlier, these signals may include the wide area content data, the local area content data, overhead information, and timing signals. The timing signals, generally called pilot signals, are used by the mobile device to recognize receipt of the broadcast signal and to establish a point of reference for the remaining parts of the signal. The content data may be separated into different channels and broadcast at separate times or frequencies (depending on the encoding method). The overhead information may be used by the mobile device to determine which parts of the broadcast signal to decode. For example, if the user only desires to receive one channel from among the twenty or fifty offered, then the mobile device can use the overhead information to demodulate and decode only that portion of the broadcast signal related to the desired channel. Performing in this manner provides efficient power usage and extends a battery's operating life.

The data, pilots, and overhead information for local and wide-area transmissions may be multiplexed in various manners. For example, the data symbols for the wide-area transmission may be multiplexed onto a "transmission span" allocated for the wide-area transmission, the data symbols for the local transmission may be multiplexed onto a transmission span allocated for the local transmission, the TDM and/or FDM pilots for the wide-area transmission may be multiplexed onto a transmission span allocated for these pilots, and the TDM and/or FDM pilots for the local transmission may be multiplexed onto a transmission span allocated for these pilots. The overhead information for the local and wide-area transmissions may be multiplexed onto one or more designated transmission spans. The different transmission spans may correspond to (1) different sets of frequency subbands if FDM is utilized by the wireless broadcast network, (2) different time segments if TDM is utilized, or (3) different groups of subbands in different time segments if both TDM and FDM are utilized. Various multiplexing schemes are described below. More than two different types of transmission with more than two different tiers of coverage may also be processed, multiplexed, and broadcast. A wireless device in the wireless broadcast network performs the complementary processing to recover the data for the local and wide-area transmissions.

Figure 2:
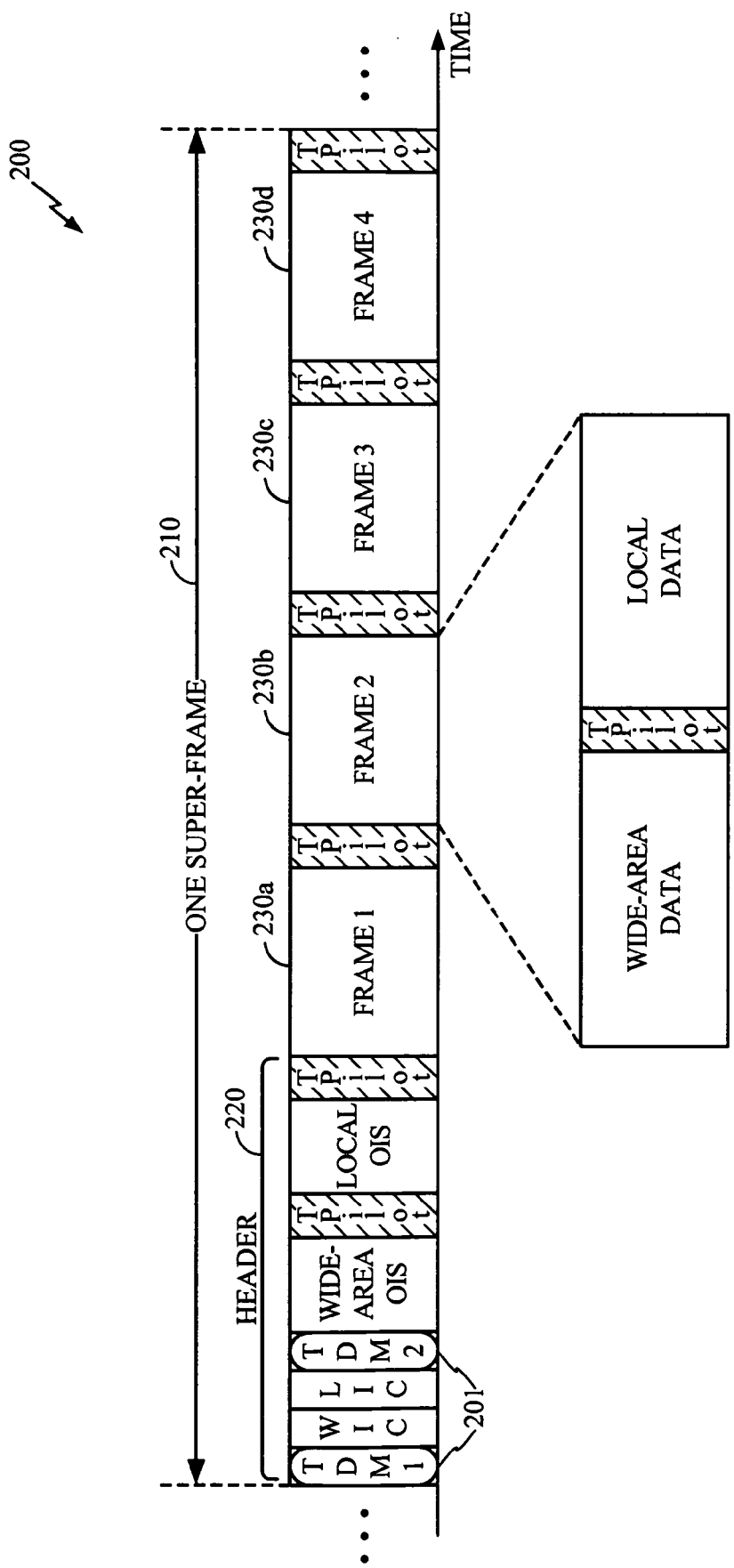
FIG. 2 depicts an exemplary superframe that may be broadcast within the networks of FIGS. 1A and 1B.

FIG. 2 shows an exemplary super-frame structure 200 that may be used to broadcast local and wide-area transmissions in an OFDM-based wireless broadcast network. Data transmission occurs in units of super-frames 210. Each super-frame spans a predetermined time duration, which may be selected based on various factors such as, for example, the desired statistical multiplexing for data streams being broadcast, the amount of time diversity desired for the data streams, acquisition time for the data streams, buffer requirements for the wireless devices, and so on. A super-frame size of approximately one second may provide a good tradeoff between the various factors noted above. However, other super-frame sizes may also be used.

For the embodiment shown in FIG. 2, each super-frame 210 includes a header segment 220, four equal-size frames 230a through 230d, and a trailer segment 240, which are not shown to scale in FIG. 2. Table 1 lists the various fields for segments 220 and 240 and for each frame 230.

| Fields | Description |
| --- | --- |
| TDM Pilot | TDM Pilot used for signal detection, frame synchronization, frequency error estimation, and time synchronization |
| Transition Pilot | Pilot used for channel estimation and possibly time synchronization and sent at the boundary of wide-area and local fields/transmissions |
| WIC | Wide-Area identification channel - carries an identifier assigned to the wide-area being served |
| LIC | Local identification channel - carries an identifier assigned to the local area being served |
| Wide-Area OIS | Wide-Area overhead information symbol - carries overhead information (e.g., frequency/time location and allocation) for each data channel being sent in the wide-area data field |
| Local OIS | Local overhead information symbol - carries overhead information for each data channel being sent in the local data field |
| Wide-Area Data | Carries data channels for the wide-area transmission |
| Local Data | Carries data channels for local transmission |

For the embodiment shown in FIG. 2, different pilots are used for different purposes. A pair of TDM pilots 201 are transmitted at or near the start of each super-frame and may be used for the purposes noted in Table 1. A transition pilot is sent at the boundary between local and wide-area fields/transmissions, and allows for seamless transition between the local and wide-area fields/transmissions.

The local and wide-area transmissions may be for multimedia content such as video, audio, teletext, data, video/audio clips, and so on, and may be sent in separate data streams. For example, a single multimedia (e.g., television) program may be sent in three separate data streams for video, audio, and data. The data streams are sent on data channels. Each data channel may carry one or multiple data streams. A data channel carrying data streams for a local transmission is also called a "local channel", and a data channel carrying data streams for a wide-area transmission is also called a "wide-area channel". The local channels are sent in the Local Data fields and the wide-area channels are sent in the Wide-Area Data fields of the super-frame.

Each data channel may be "allocated" a fixed or variable number of interlaces in each super-frame depending on the payload for the data channel, the availability of interlaces in the super-frame, and possibly other factors. Each data channel may be active or inactive in any given super-frame. Each active data channel is allocated at least one interlace. Each active data channel is also "assigned" specific interlaces within the super-frame based on an assignment scheme that attempts to (1) pack all of the active data channels as efficiently as possible, (2) reduce the transmission time for each data channel, (3) provide adequate time-diversity for each data channel, and (4) minimize the amount of signaling needed to indicate the interlaces assigned to each data channel. For each active data channel, the same interlace assignment may be used for the four frames of the super-frame.

The Local OIS field indicates the time-frequency assignment for each active local channel for the current super-frame. The Wide-Area OIS field indicates the time-frequency assignment for each active wide-area channel for the current super-frame. The Local OIS and Wide-Area OIS are sent at the start of each super-frame to allow the wireless devices to determine the time-frequency location of each data channel of interest in the super-frame.

The various fields of the super-frame may be sent in the order shown in FIG. 2 or in some other order. In general, it is desirable to send the TDM pilot and overhead information early in the super-frame so that the TDM pilot and overhead information can be used to receive the data being sent later in the super-frame. The wide-area transmission may be sent prior to the local transmission, as shown in FIG. 2, or after the local transmission.

FIG. 2 shows a specific super-frame structure. In general, a super-frame may span any time duration and may include any number and any type of segments, frames, and fields. However, there is normally a useful range of super-frame durations related to acquisition time and cycling time for the receiver electronics. Other super-frame and frame structures may also be used for broadcasting different types of transmission, and this is within the scope of the invention.

The pilot signals of FIG. 2 that are transmitted during the broadcast transmission may be used to derive (1) a channel estimate for the wide-area transmission, which is also called a wide-area channel estimate, and (2) a channel estimate for the local transmission, which is also called a local channel estimate. The local and wide-area channel estimates may be used for data detection and decoding for the local and wide-area transmissions, respectively. These pilots may also be used for channel estimation, time synchronization, acquisition (e.g., automatic gain control (AGC)), and so on. The transition pilot may also be used to obtain improved timing for the local transmission as well as the wide-area transmission.

Figure 3:
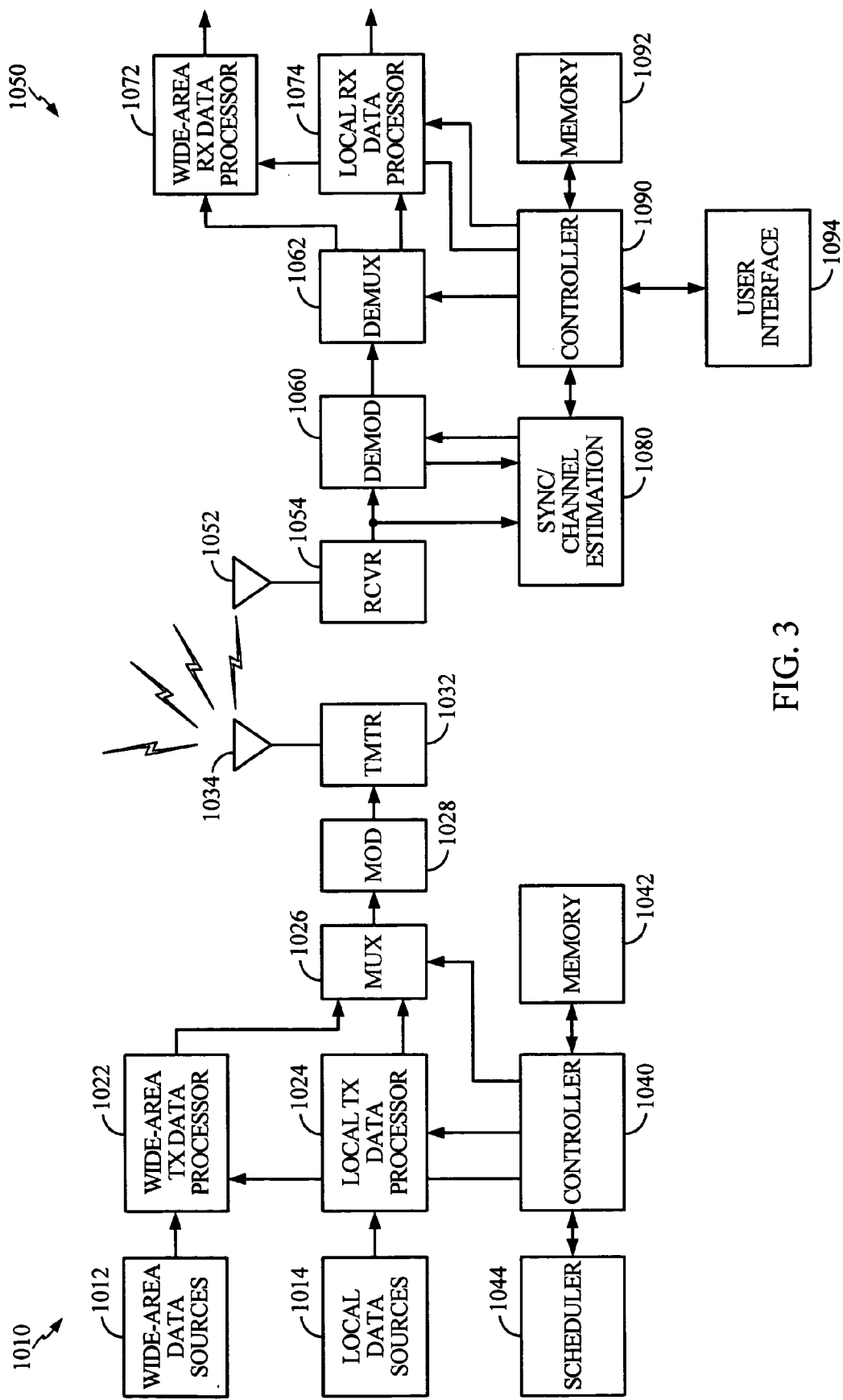
FIG. 3 illustrates a base station and mobile device for implementing portions of the networks of FIGS. 1A and 1B.

FIG. 3 shows a block diagram of a base station 1010 and a wireless device 1050 in wireless broadcast network 100 in FIGS. 1A and 1B. Base station 1010 is generally a fixed station and may also be called an access point, a transmitter, or some other terminology. Wireless device 1050 may be fixed or mobile and may also be called a user terminal, a mobile station, a receiver, or some other terminology. Wireless device 1050 may also be a portable unit such as a cellular phone, a handheld device, a wireless module, a personal digital assistant (PDA), and so on.

At base station 1010, a transmit (TX) data processor 1022 receives data for a wide-area transmission from sources 1012, processes (e.g., encodes, interleaves, and symbol maps) the wide-area data, and generates data symbols for the wide-area transmission. A data symbol is a modulation symbol for data, and a modulation symbol is a complex value for a point in a signal constellation for a modulation scheme (e.g., M-PSK, M-QAM, and so on). TX data processor 1022 also generates the FDM and transition pilots for the wide area in which base station 1010 belongs and provides the data and pilot symbols for the wide area to a multiplexer (Mux) 1026. A TX data processor 1024 receives data for a local transmission from sources 1014, processes the local data, and generates data symbols for the local transmission. TX data processor 1024 also generates the pilots for the local area in which base station 1010 belongs and provides the data and pilot symbols for the local area to multiplexer 1026. The coding and modulation for data may be selected based on various factors such as, for example, whether the data is for wide-area or local transmission, the data type, the desired coverage for the data, and so on.

Multiplexer 1026 multiplexes the data and pilot symbols for the local and wide areas as well as symbols for overhead information and the TDM pilot onto the subbands and symbol periods allocated for these symbols. A modulator (Mod) 1028 performs modulation in accordance with the modulation technique used by network 100. For example, modulator 1028 may perform OFDM modulation on the multiplexed symbols to generate OFDM symbols. A transmitter unit (TMTR) 1032 converts the symbols from modulator 1028 into one or more analog signals and further conditions (e.g., amplifies, filters, and frequency upconverts) the analog signal(s) to generate a modulated signal. Base station 1010 then transmits the modulated signal via an antenna 1034 to wireless devices in the network.

At wireless device 1050, the transmitted signal from base station 1010 is received by an antenna 1052 and provided to a receiver unit (RCVR) 1054. Receiver unit 1054 conditions (e.g., filters, amplifies, and frequency downconverts) the received signal and digitizes the conditioned signal to generate a stream of data samples. A demodulator (Demod) 1060 performs (e.g., OFDM) demodulation on the data samples and provides received pilot symbols to a synchronization (Sync)/channel estimation unit 1080. Unit 1080 also receives the data samples from receiver unit 1054, determines frame and symbol timing based on the data samples, and derives channel estimates for the local and wide areas based on the received pilot symbols for these areas. Unit 1080 provides the symbol timing and channel estimates to demodulator 1060 and provides the frame timing to demodulator 1060 and/or a controller 1090. Demodulator 1060 performs data detection on the received data symbols for the local transmission with the local channel estimate, performs data detection on the received data symbols for the wide-area transmission with the wide-area channel estimate, and provides detected data symbols for the local and wide-area transmissions to a demultiplexer (Demux) 1062. The detected data symbols are estimates of the data symbols sent by base station 1010 and may be provided in log-likelihood ratios (LLRs) or some other form.

Demultiplexer 1062 provides detected data symbols for all wide-area channels of interest to a receive (RX) data processor 1072 and provides detected data symbols for all local channels of interest to an RX data processor 1074. RX data processor 1072 processes (e.g., deinterleaves and decodes) the detected data symbols for the wide-area transmission in accordance with an applicable demodulation and decoding scheme and provides decoded data for the wide-area transmission. RX data processor 1074 processes the detected data symbols for the local transmission in accordance with an applicable demodulation and decoding scheme and provides decoded data for the local transmission. In general, the processing by demodulator 1060, demultiplexer 1062, and RX data processors 1072 and 1074 at wireless device 1050 is complementary to the processing by modulator 1028, multiplexer 1026, and TX data processors 1022 and 1024, respectively, at base station 1010.

Controllers 1040 and 1090 direct operation at base station 1010 and wireless device 1050, respectively. These controllers may be hardware-based, software-based or a combination of both. Memory units 1042 and 1092 store program codes and data used by controllers 1040 and 1090, respectively. A scheduler 1044 schedules the broadcast of local and wide-area transmissions and allocates and assigns resources for the different transmission types.

For clarity, FIG. 3 shows the data processing for the local and wide-area transmissions being performed by two different data processors at both base station 1010 and wireless device 1050. The data processing for all types of transmission may be performed by a single data processor at each of base station 1010 and wireless device 1050. FIG. 3 also shows the processing for two different types of transmission. In general, any number of types of transmission with different coverage areas may be transmitted by base station 1010 and received by wireless device 1050. For clarity, FIG. 3 also shows all of the units for base station 1010 being located at the same site. In general, these units may be located at the same or different sites and may communicate via various communication links. For example, data sources 1012 and 1014 may be located off site, transmitter unit 1032 and/or antenna 1034 may be located at a transmit site, and so on.

A user interface 1094 is also in communication with the controller 1090 that allows the user of the device 1050 to control aspects of its operation. For example, the interface 1094 can include a keypad and display along with the underlying hardware and software needed to prompt a user for commands and instructions and then to process them once they are received. For example, the user interface 1094 may be used to alert a user that a new network is providing better signal strength than the current network and to ask the user if the device 1050 should acquire the new network. The display of the other networks may include their WIC/LIC information as well as a score or value indicative of their signal quality or strength.

Figure 4:
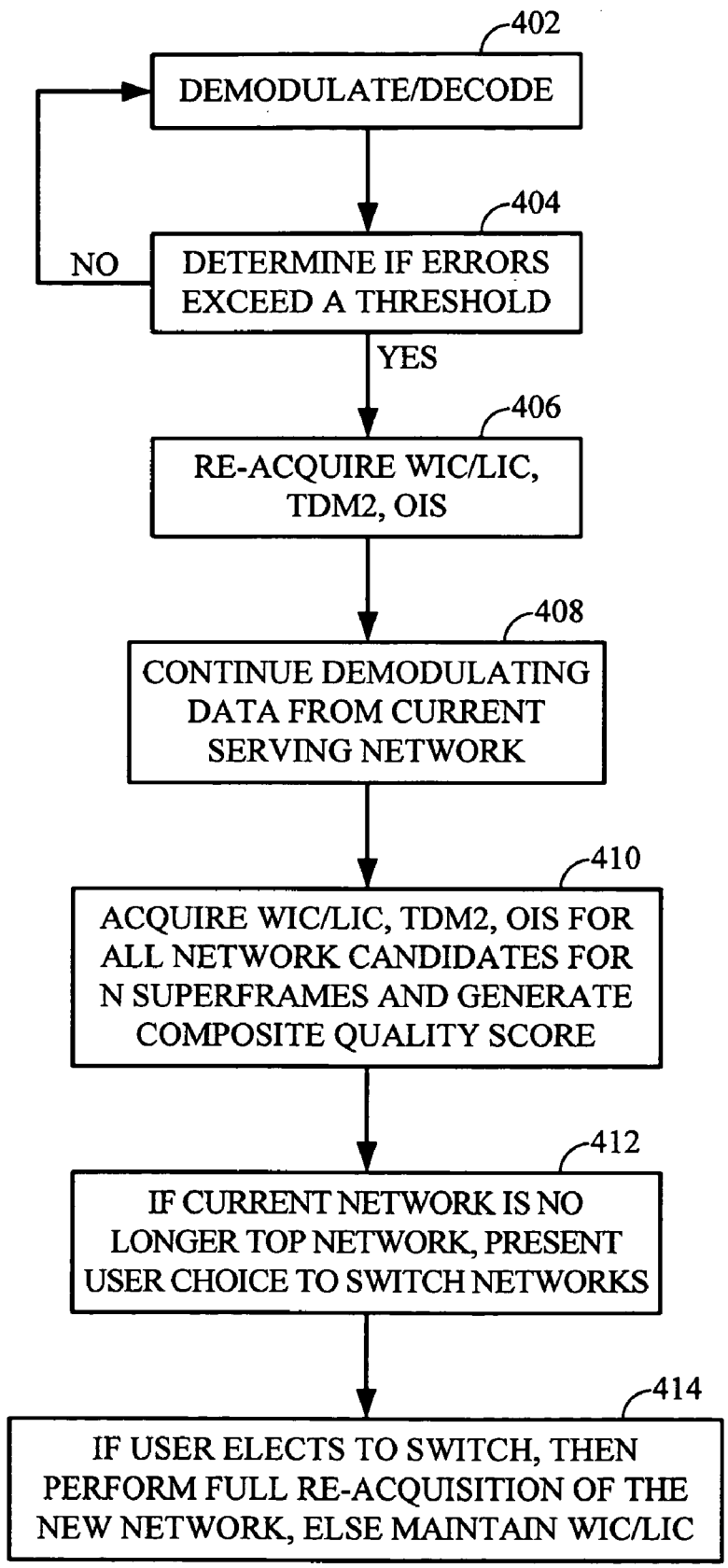
FIG. 4 depicts a flowchart of an exemplary method for a mobile device to switch between different wireless broadcast networks.

FIG. 4 depicts a flowchart of an exemplary method to determine when a mobile device should change from one broadcast network to another. In step 402, the mobile device operates normally and demodulates and decodes data based on the presently selected serving broadcast network. The demodulating and decoding of the signal is based on previously detected TDM pilot signals (as well as possibly other pilot signals) that provide timing information and channel estimation.

During decoding, errors may occur and be detected through the use of error-correcting codes and other techniques. Because of the uncertainty of the wireless environment, a certain amount of errors will likely occur even in a correctly operating system. Thus, a threshold value is usually selected that defines an acceptable number of errors. This acceptable number of errors can be based on an entire superframe or based on each separate frame inside the superframe. Thus, one threshold might be "16 errors or less within the entire superframe" while another threshold may be "no more than 2 errors within any individual frame". Furthermore, the threshold might be specific to the wide area vs. local area data such that more errors are allowed in the local area data than in the wide area data. Regardless, one of ordinary skill will recognize that there are many different ways to measure and determine if a predetermined error threshold has been exceeded.

If more than the allowed number of errors is reached, in step 404, then the software executing on the mobile device causes the demodulator to re-acquire the present signal, in step 406. This re-acquisition may be an entirely new acquisition starting from scratch or it may be a partial re-acquisition using some of the previously detected information. For example, one advantageous method of re-acquiring a signal which uses the superframe of FIG. 2 is to attempt to re-acquire the WIC/LIC, TDM2 and OIS. Based on the re-acquired information, the timing resolution for future demodulating and decoding may be improved. This step will likely correct any problems that were simply being caused by a timing problem.

In step 408, the mobile device continues demodulating and decoding data from the current serving network. Concurrently, in step 410, the mobile device acquires all signals it can detect and generates a score indicative of the quality of each signal. Advantageously, the number of samples for each signal is more than one so that the quality score for each signal is a composite score based on the different samples for each signal. For example, 5 samples (or more or less samples) for each signal may be detected and the respective quality scores for each sample averaged together to generate the composite score for a signal. Using the superframe of FIG. 2, the WIC/LIC, TDM2 and OIS for all detectable network candidates can be acquired. Based on the pilot signals and/or other signals, a quality score can be assigned to each WIC/LIC. As mentioned, this quality score can be made by detecting multiple superframes from each WIC/LIC.

In step 412, a determination is made if the WIC/LIC of the currently serving broadcast network is the top network (based on quality scores) from the list of network candidates located in step 410. If the top network in the candidate list is different, then the user can be presented a choice of switching to the new network or remaining on the current network. If the user remains, then the received signal may be of reduced quality but it will continue to be demodulated and decoded. Eventually, the signal may become too degraded and the signal lock will be lost.

In step 414, if the user elects to switch networks, then the mobile device performs a full re-acquisition of the new network. Using the superframe example of FIG. 2, the mobile device acquires TDM1, WIC/LIC, TDM2, and OIS for the new network to begin demodulating and decoding that broadcast signal.

The above method prevents the ping-pong effect of switching between two adjacent networks described earlier in at least two different ways. First, by choosing not to switch, the user may prevent automatic switching from one network to another even though the relative signal strengths of the two networks may suggest otherwise. Secondly, by combining the quality scores over a number of samples, temporal anomalies in signal strength are ignored so as not to cause problems. Accordingly, the switching between two networks can still occur efficiently but can be performed in a user-friendly manner.

Figure 5:
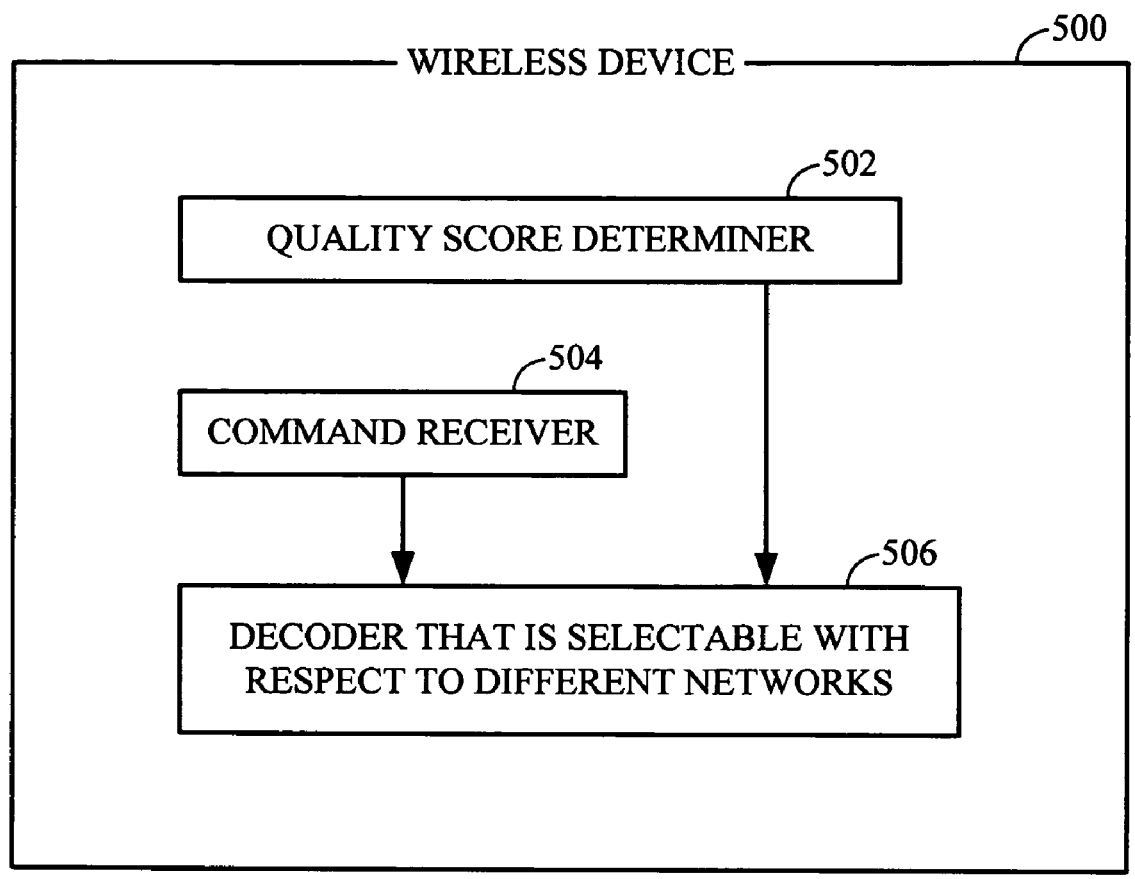
FIG. 5 illustrates an alternative embodiment of a mobile device in accordance with the principle of the present invention.

FIG. 5 illustrates an alternative, block-level view of a mobile device 500 operable in accordance with the principles of the present invention. There is determining means 502 that determines a respective quality score for each of a plurality of broadcast networks. This quality score is indicative of the likelihood of successfully receiving and decoding a particular broadcast network signal with an acceptable level of errors. The device 500 also includes receiving means that receives a command from a user or operator of the device 500. The command relates to whether or not the user would like to switch from one broadcast network to another broadcast network. The results of the receiving means 504 and the determining means 502 are provided to a decoding means 506. More particularly, the decoding means can select which of the broadcast network signals to decode. For example, the decoding means may remain at its current selection and continue to receive and decode a current broadcast network signal. Alternatively, if so commanded, the decoding means can switch so that it receives and decodes a different broadcast network signal, one having the highest quality score. Accordingly, the mobile device 500 operates to allow a user input to play a factor in whether or not the device 500 switches from one broadcast network to another.

The techniques described herein for broadcasting different types of transmission over the air may be implemented by various means. For example, these techniques may be implemented in hardware, software, or a combination thereof. For a hardware implementation, the processing units at a base station used to broadcast different types of transmission may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units at a wireless device used to receive different types of transmission may also be implemented within one or more ASICs, DSPs, and so on.

For a software implementation, the techniques described herein may be implemented with modules (e.g., procedures, functions, and so on) that perform the functions described herein. The software codes may be stored in a memory unit (e.g., memory unit 1042 or 1092 in FIG. 3) and executed by a processor (e.g., controller 1040 or 1090). The memory unit may be implemented within the processor or external to the processor, in which case it can be communicatively coupled to the processor via various means as is known in the art.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A wireless communications device comprising:
a receiver including a demodulator and a decoder configured to demodulate and decode a current signal from an orthogonal frequency division multiplexing (OFDM)-based air interface based on previously detected signals, detect decoding errors for the current signal, determine whether the detected decoding errors exceed a predetermined decoding error threshold, and in response to determining that the detected decoding errors exceed the predetermined error threshold:
continue demodulating and decoding the current signal; and
acquire signals from the plurality of OFDM networks;
a processor configured to assign a quality score to each of the plurality of OFDM networks based on the acquired signals, determine one of the plurality of OFDM networks having a highest quality score, and determine whether the current signal is provided by the one of the plurality of OFDM networks having the highest quality score; and
a user interface configured to display a query and receive from a user of the device a command related to selecting the determined one of the plurality of networks, wherein the query is displayed in response to a determination that the current signal is not provided by the determined one of the plurality of OFDM networks having the highest quality score,
wherein the receiver, controlled by the processor, is configured to change from decoding the current signal to decoding a signal of the determined one of the plurality of OFDM networks having the highest quality score based on the received user command.

2. The wireless communications device of claim 1, wherein:
the receiver is further configured to receive a respective signal from at least a subset of the plurality of OFDM networks.

3. The wireless communications device of claim 2, wherein:
the processor is further configured to determine a respective quality score for each of the subset of the plurality of OFDM networks.

4. The wireless communications device of claim 3, wherein:
the respective quality score for each of the subset of the plurality of OFDM networks is based on a respective signal strength of the respective signals.

5. The wireless communications device of claim 3, wherein:
the respective quality score for each of the subset of the plurality of OFDM networks is based on one or more respective pilot signals within each respective signal.

6. The wireless communications device of claim 3, wherein:
the user interface is further configured to present to the user a query that includes at least the OFDM networks with the two highest quality scores and is related to selection of a new network, from among the plurality of OFDM networks, to begin decoding.

7. The wireless communications device of claim 2, wherein:
the processor is further configured, for each of the subset of the plurality of OFDM networks, to:
acquire a plurality of samples of the respective signal, determine an intermediate quality score for each sample, and combine the intermediate quality scores to calculate a respective quality score.

8. The wireless communications device of claim 7, wherein the plurality of samples include between 2 and 5 samples.

9. A wireless communications device comprising:
a receiver configured to decode a current signal from a current network within a plurality of networks, each having a respective signal, detect decoding errors for the current signal, determine whether the detected decoding errors exceed a predetermined decoding error threshold, and in response to determining that the detected decoding errors exceed the predetermined error threshold:
continue demodulating and decoding the current signal; and
acquire signals from the plurality of networks;
a processor configured to determine one of the respective signals having a highest quality score relative to the others; and
a user interface configured to present to a user of the wireless communication device a query regarding switching signals when the current signal does not have the highest quality score, and to receive an instruction from the user in response to the query,
wherein the receiver is further configured to
switch to decoding the determined one of the respective signals having the highest quality score when the received instruction indicates the user elects to switch to another signal.

10. The wireless communications device of claim 9, wherein:
the processor is configured to determine a respective quality score for the respective signals of the plurality of networks.

11. The wireless communications device of claim 10, wherein:
the query includes an identification of the respective signals having the n highest quality scores, wherein n is between 2 and 4.

12. The wireless communications device of claim 10, wherein:
the processor is further configured to determine the respective quality scores based on n samples of each of the respective signals, where n is between 2 and 10.

13. The wireless communications device of claim 12, wherein n is between 2 and 5.

14. The wireless communications device of claim 9, wherein:
each of the respective signals include local area content and wide area content.

15. The wireless communications device of claim 14, wherein:
a subset of the respective signals includes two or more signals having the same wide area content while having different local area content.

16. A method of switching between networks in a wireless communications device comprising:
decoding a current signal from among a plurality of signals, each from a respective network;
detecting decoding errors for the current signal;
determining whether the detected decoding errors exceed a predetermined decoding error threshold;
continuing to decode the current signal when it is determined that the detected decoding errors exceed the predetermined error threshold;
acquiring the plurality of signals when it is determined that the detected decoding errors exceed the predetermined error threshold;
determining if one of the acquired plurality of signals has a quality score higher than the current signal;
querying a user of the device regarding whether to switch to another signal when it is determined that one of the plurality of signals has a quality score higher than the current signal;
receiving an input from the user in response to the querying;
switching to decoding one of the plurality of signals that has a quality score higher than the current signal if the received user input indicates the user elects to switch to another signal; and
otherwise, continuing to decode the current signal.

17. The method of claim 16, further comprising:
calculating respective quality scores for each of the plurality of signals.

18. The method of claim 17, wherein calculating further comprises:
acquiring a plurality of samples for each of the plurality of signals;
determining an intermediate quality score for each of the plurality of samples; and
combining the intermediate quality scores to form each of the respective quality scores.

19. A computer readable storage medium containing a set of instructions executable on a computer for switching between networks in a wireless communications device containing the computer, said instructions comprising:
a routine to decode a current signal from among a plurality of signals, each from a respective network;
a routine to detect decoding errors for the current signal;
a routine to determine whether the detected decoding errors exceed a predetermined decoding error threshold;
a routine to continue to decode the current signal when it is determined that the detected decoding errors exceed the predetermined error threshold;
a routine to acquire the plurality of signals when it is determined that the detected decoding errors exceed the predetermined error threshold;
a routine to determine if one of the plurality of signals has a quality score higher than the current signal when it is determined that the detected decoding errors exceed the predetermined error threshold;
a routine to query a user of the device regarding whether to switch to the one of the plurality of signals when it is determined that one of the plurality of signals has a quality score higher than the current signal;
a routine to receive input from the user in response to the querying;
a routine to switch to decoding the one of the plurality of signals that has a quality score higher than the current signal if the received user input indicates the user elects to switch to one of the plurality of signals; and
a routine to continue decoding the current signal when the user does not elect to switch to another signal.

20. A wireless communications device comprising:
means for demodulating and decoding a current signal from an orthogonal frequency division multiplexing (OFDM)-based air interface based on previously detected signals:
means for measuring decoding errors and determining whether the measured decoding errors for the current signal exceed a predetermined decoding error threshold;
means for continuing to demodulate and decode the current signal when it is determined that the measured decoding errors exceed the predetermined error threshold; and
means for acquiring signals from a plurality of OFDM networks when it is determined that the measured decoding errors exceed the predetermined error threshold;
means for determining if one of the acquired plurality of OFDM networks has a highest quality score that the current broadcast signal;
means for querying a user of the wireless communications device regarding whether to switch to another network when it is determined that one of the acquired plurality of OFDM networks has a quality score higher than the current signal;

means for receiving a user input related to switching networks in response to the query;

means for switching to decoding a signal of the one of the plurality of OFDM networks having the highest quality score if the received user input indicates the user elects to switch networks.

21. The computer readable storage medium of claim 19, wherein said instructions further comprises a routine to determine a respective quality score for the respective signals of the plurality of networks.

22. The computer readable storage medium of claim 19, wherein said routine to query comprises an identification of the respective signals having the n highest quality scores, wherein n is between 2 and 4.

23. The computer readable storage medium of claim 19, wherein said instructions further comprises a routine to determine the respective quality scores based on n samples of each of the respective signals, where n is between 2 and 10.

24. The computer readable storage medium of claim 23, wherein each of the respective signals include local area content and wide area content.

25. The computer readable storage medium of claim 24, wherein a subset of the respective signals includes two or more signals having the same wide area content while having different local area content.

26. The wireless communications device of claim 20, further comprising means for receiving a respective signal from at least a subset of the plurality of OFDM networks.

27. The wireless communications device of claim 26, further comprising means for determining a respective quality score for each of the subset of the plurality of OFDM networks.

28. The wireless communications device of claim 27, wherein the respective quality score for each of the subset of the plurality of OFDM networks is based on a respective signal strength of the respective signals.

29. The wireless communications device of claim 27, wherein the respective quality score for each of the subset of the plurality of OFDM networks is based on one or more respective pilot signals within each respective signal.

30. The wireless communications device of claim 27, further comprising means for presenting to the user a query that includes at least the OFDM networks with the two highest quality scores and is related to selection of a new network, from among the plurality of OFDM networks, to begin decoding.

31. The wireless communications device of claim 26, further comprising:

means for acquiring a plurality of samples of the respective signal;

means for determining an intermediate quality score for each sample, and means for combining the intermediate quality scores to calculate a respective quality score.

32. The wireless communications device of claim 31, wherein the plurality of samples include between 2 and 5 samples.

* * * * *